(12) United States Patent  (10) Patent No.: US 7,656,067 B2
Dooley  (45) Date of Patent: Feb. 2, 2010

(54) CURRENT LIMITING MEANS FOR A GENERATOR

(75) Inventor: Kevin Allan Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 12/203,318

(22) Filed: Sep. 3, 2008

(65) Prior Publication Data

US 2008/0315706 A1  Dec. 25, 2008

Related U.S. Application Data

(60) Division of application No. 11/832,121, filed on Aug. 1, 2007, now Pat. No. 7,436,098, which is a continuation of application No. 11/103,610, filed on Apr. 12, 2005, now Pat. No. 7,309,939, which is a continuation of application No. 10/393,252, filed on Mar. 21, 2003, now Pat. No. 7,119,467.

(51) Int. Cl.
*H20K 3/04* (2006.01)
(52) U.S. Cl. ............... 310/201; 310/216; 310/204; 310/245
(58) Field of Classification Search ............ 310/201, 310/216, 204, 245
See application file for complete search history.

(56) References Cited

U.S. PATENT DOCUMENTS

| 911,713 | A | 2/1909 | Frankenfield |
|---|---|---|---|
| 1,756,672 | A | 4/1930 | Barr |
| 3,707,638 | A | 12/1972 | Nailen |
| 3,753,068 | A | 8/1973 | Walker, Jr. |
| 3,812,441 | A | 5/1974 | Sakamoto et al. |
| 3,961,211 | A | 6/1976 | Vergues |
| 4,004,202 | A | 1/1977 | Davis |
| 4,025,840 | A | 5/1977 | Brissey et al. |
| 4,032,807 | A | 6/1977 | Richter |
| 4,039,910 | A | 8/1977 | Chirgwin |
| 4,190,794 | A | 2/1980 | Mikulic |
| 4,237,395 | A | 12/1980 | Loudermilk |
| 4,250,128 | A | 2/1981 | Meckling |
| 4,311,932 | A | 1/1982 | Olson |
| 4,346,335 | A | 8/1982 | McInnis |

(Continued)

FOREIGN PATENT DOCUMENTS

EP  0 022 379  1/1981

(Continued)

OTHER PUBLICATIONS

General Electric Company, "150Kva Samarium Cobalt VSCF Starter/Generator Electrical System, Final Technical Report", 1979.

(Continued)

*Primary Examiner*—Nicholas Ponomarenko
*Assistant Examiner*—Iraj A Mohandesi
(74) *Attorney, Agent, or Firm*—Ogilvy Renault LLP

(57) ABSTRACT

The invention provides means of limiting maximum current conducted through windings of an electric machine having a rotor and a stator. By encouraging an appropriate leakage flux around a winding, a leak impedance can be achieved which may be used, according to the invention, to limit the maximum current in the winding as a matter of machine design.

10 Claims, 9 Drawing Sheets

U.S. PATENT DOCUMENTS

| | | | |
|---|---|---|---|
| 4,392,072 A | 7/1983 | Rosenberry | |
| 4,401,906 A | 8/1983 | Isobe et al. | |
| 4,445,061 A | 4/1984 | Jackson, Jr. | |
| 4,492,902 A | 1/1985 | Ficken et al. | |
| 4,503,377 A | 3/1985 | Kitabayashi et al. | |
| 4,511,831 A | 4/1985 | McInnis | |
| 4,547,713 A | 10/1985 | Langley et al. | |
| 4,562,399 A | 12/1985 | Fisher | |
| 4,605,874 A | 8/1986 | Whiteley | |
| 4,617,726 A | 10/1986 | Denk | |
| 4,625,135 A | 11/1986 | Kasabian | |
| 4,638,201 A | 1/1987 | Feigel | |
| 4,709,180 A | 11/1987 | Denk | |
| 4,763,034 A | 8/1988 | Gamble | |
| 4,799,578 A | 1/1989 | Matsushita | |
| 4,852,245 A | 8/1989 | Denk | |
| 4,887,020 A | 12/1989 | Graham | |
| 4,896,756 A | 1/1990 | Matsushita | |
| 4,897,570 A | 1/1990 | Ishikawa et al. | |
| 4,924,125 A | 5/1990 | Clark | |
| 4,994,700 A | 2/1991 | Bansal et al. | |
| 5,030,877 A | 7/1991 | Denk | |
| 5,124,607 A | 6/1992 | Rieber et al. | |
| 5,184,040 A | 2/1993 | Lim | |
| 5,214,839 A | 6/1993 | Rieber et al. | |
| 5,235,231 A | 8/1993 | Hisey | |
| 5,304,883 A | 4/1994 | Denk | |
| 5,397,948 A | 3/1995 | Zoerner et al. | |
| 5,519,275 A | 5/1996 | Scott et al. | |
| 5,555,722 A | 9/1996 | Mehr-Ayin et al. | |
| 5,583,387 A | 12/1996 | Takeuchi et al. | |
| 5,585,682 A | 12/1996 | Konicek et al. | |
| 5,714,823 A | 2/1998 | Shervington et al. | |
| 5,729,072 A | 3/1998 | Hirano et al. | |
| 5,742,106 A | 4/1998 | Muraji | |
| 5,770,901 A | 6/1998 | Niimi et al. | |
| 5,793,137 A | 8/1998 | Smith | |
| 5,793,178 A | 8/1998 | Biais | |
| 5,798,596 A | 8/1998 | Lordo | |
| 5,822,150 A | 10/1998 | Kelsic | |
| 5,825,597 A | 10/1998 | Young | |
| 5,834,874 A | 11/1998 | Krueger et al. | |
| 5,838,080 A | 11/1998 | Coiderchon et al. | |
| 5,903,115 A | 5/1999 | Taylor | |
| 5,912,522 A | 6/1999 | Rivera | |
| 5,917,248 A | 6/1999 | Seguchi et al. | |
| 5,925,999 A | 7/1999 | Lakerdas et al. | |
| 5,936,325 A | 8/1999 | Permuy | |
| 5,942,829 A | 8/1999 | Huynh | |
| 5,952,757 A | 9/1999 | Boyd, Jr. | |
| 5,953,491 A | 9/1999 | Sears et al. | |
| 5,955,809 A | 9/1999 | Shah | |
| 5,962,938 A | 10/1999 | Bobay et al. | |
| 6,097,124 A | 8/2000 | Rao et al. | |
| 6,100,620 A | 8/2000 | Radovsky | |
| 6,114,784 A | 9/2000 | Nakano | |
| 6,124,660 A | 9/2000 | Umeda et al. | |
| 6,177,747 B1 | 1/2001 | Maeda et al. | |
| 6,239,532 B1 | 5/2001 | Hollenbeck et al. | |
| 6,242,840 B1 | 6/2001 | Denk et al. | |
| 6,249,956 B1 | 6/2001 | Maeda et al. | |
| 6,255,756 B1 | 7/2001 | Richter | |
| 6,265,801 B1 | 7/2001 | Hashiba et al. | |
| 6,271,613 B1 | 8/2001 | Akemakou et al. | |
| 6,286,199 B1 | 9/2001 | Bobay et al. | |
| 6,291,918 B1 | 9/2001 | Umeda et al. | |
| 6,313,560 B1 | 11/2001 | Dooley | |
| 6,323,625 B1 | 11/2001 | Bhargava | |
| 6,342,746 B1 | 1/2002 | Flynn | |
| 6,369,687 B1 | 4/2002 | Akita et al. | |
| 6,373,162 B1 | 4/2002 | Liang et al. | |
| 6,414,410 B1 | 7/2002 | Nakamura et al. | |
| 6,429,615 B2 | 8/2002 | Schmider et al. | |
| 6,437,529 B1 | 8/2002 | Brown | |
| 6,459,186 B1 | 10/2002 | Umeda et al. | |
| 6,504,261 B2 | 1/2003 | Fogarty et al. | |
| 6,525,504 B1 | 2/2003 | Nygren et al. | |
| 6,541,887 B2 | 4/2003 | Kawamura | |
| 6,965,183 B2 * | 11/2005 | Dooley | 310/201 |
| 7,081,697 B2 * | 7/2006 | Neet | 310/216.011 |
| 7,309,939 B2 * | 12/2007 | Dooley | 310/201 |
| 2001/0030483 A1 | 10/2001 | Masumoto et al. | |
| 2002/0074871 A1 | 6/2002 | Kikuchi et al. | |
| 2002/0074889 A1 | 6/2002 | Kikuchi et al. | |
| 2002/0084705 A1 | 7/2002 | Kawamura | |
| 2002/0084715 A1 | 7/2002 | Kakuta et al. | |
| 2002/0093252 A1 | 7/2002 | Kang et al. | |
| 2002/0093269 A1 | 7/2002 | Harter et al. | |
| 2002/0096960 A1 | 7/2002 | Tong et al. | |
| 2002/0149281 A1 | 10/2002 | Saint-Michel et al. | |

FOREIGN PATENT DOCUMENTS

| | | |
|---|---|---|
| EP | 368930 | 4/1994 |
| EP | 754365 | 2/1998 |
| EP | 750806 | 8/1998 |
| EP | 0 881 744 A2 | 12/1998 |
| EP | 0 932 246 A2 | 7/1999 |
| FR | 1555855 | 12/1968 |
| FR | 2618616 | 7/1987 |
| JP | 5-316677 | 11/1993 |
| JP | 6-22478 | 1/1994 |
| JP | 6-105488 | 4/1994 |
| JP | 07-123621 | 5/1995 |
| JP | 11-89197 | 3/1999 |
| JP | 11-164500 | 6/1999 |
| JP | 2000-166152 | 6/2000 |
| JP | 2001-25197 | 1/2001 |
| JP | 2001-86668 | 3/2001 |
| JP | 2001-186728 | 7/2001 |
| JP | 2001-186738 | 7/2001 |
| JP | 2002-51490 | 2/2002 |
| JP | 2002-153029 | 5/2002 |
| JP | 2002-325382 | 11/2002 |
| JP | 2002-354731 | 12/2002 |
| JP | 2002-369479 | 12/2002 |
| JP | 2003-88007 | 3/2003 |
| JP | 2003-164089 | 6/2003 |
| JP | 2003-180044 | 6/2003 |
| JP | 2003-199267 | 7/2003 |
| JP | 2003-204638 | 7/2003 |
| JP | 2003-264996 | 9/2003 |
| WO | 99/09638 | 2/1999 |
| WO | 99/66624 | 12/1999 |
| WO | 02/09260 | 1/2002 |
| WO | 03/003546 | 1/2003 |
| WO | 03/028202 | 4/2003 |

OTHER PUBLICATIONS

M. Cronin, "The All-Electric Airplane as Energy Efficient Transport", SAE Journal, 1980.
Richter, E. et al., "Jet Engine Integrated Generator" Amcn Inst. Aeronautics & Astronautics, 1981.
B. Dishner et al., "A Novel Electromechanical Approach to Constant Frequency Power Generation", IEEE Journal, 1989.
M. Cronin, "The All-Electric Airplane Revisited", SAE Technical Series, 1989.
SAE Technical Paper Series 892252, Application Consideratins for Integral Gas Turbine Electric Starter/Generator revisited, 1989.
The Applicability of Electrically Driven Accessories for Turboshaft Engines, 1993.
R. Nims, "Development of an Oilless, Gearless, and Bleedable Under Armor Power Unit" ASME paper, 1995.

Richter et al., "Preliminary Design of an Internal Starter/Generator for Application in the F110-129 Engine", SAE Aerospace Atlantic Conference, 1995.

R. Nims, "Armor-plated auxiliary power", Mechanical Engineering, 1997.

PCT International Search Report, PCT/CA2004/000408, Mailed Aug. 30, 2004.

* cited by examiner

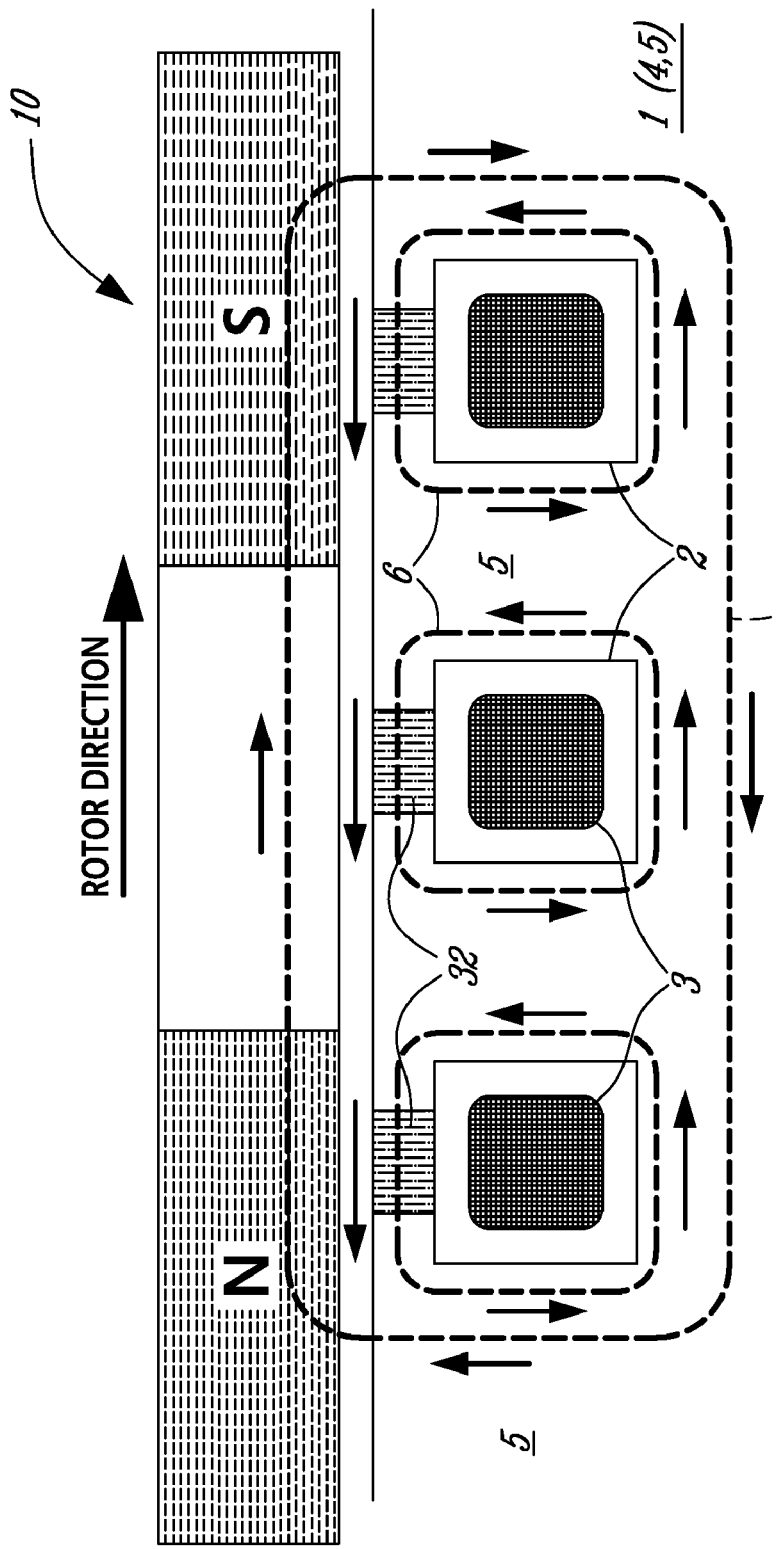

CURRENT LIMITING MEANS FOR A GENERATOR

CROSS-RELATED APPLICATIONS

The present application is a divisional of U.S. patent application Ser. No. 11/832,121, filed Aug. 1, 2007, now U.S. Pat. No. 7,436,098 which is a continuation of U.S. patent application Ser. No. 11/103,610, filed Apr. 12, 2005, now U.S. Pat. No. 7,309,939, issued Dec. 18, 2007, which is a continuation of U.S. patent application Ser. No. 10/393,252, filed Mar. 21, 2003, now U.S. Pat. No. 7,119,467, issued Oct. 10, 2006, all of which is hereby incorporated by reference.

TECHNICAL FIELD

The technical field relates to means of limiting the maximum current, including a short circuit current, in windings of an electric machine such as a generator or motor.

BACKGROUND OF THE ART

The need for preventing short circuit overloading of circuits in electric generators and motors is well recognized. Protective external circuits and equipment are often provided with fusible materials or electronic controls external to the windings of the electric machine, however internal short circuit conditions may occur within the windings of a motor/generator that would not be detected or controlled by external fusing or controls.

One approach to providing protection within the windings is disclosed in the inventor's U.S. Pat. No. 6,313,560. Due to the heat generated by high currents and high rotational speeds of machines used in "more electric" aircraft engines, the electric motor/generator and the insulated wiring conductors must be sufficiently protected from the unlikely event of internal faults during operation, to ensure redundant safety systems exist. Therefore, it is desirable to build in failsafe means for controlling maximum machine current.

DISCLOSURE OF THE INVENTION

Oftentimes, the stator of an electric machine has a plurality of slots, each slot having windings and having a slot gap adjacent to the rotor and in communication with an annular air gap separating the rotor from the stator. The improved machine and method use a leakage flux phenomenon (which is considered in transformer design but not considered in machine design) to limit the current in an electric machine. By controlling the leakage flux impedance, the maximum current in a winding can be controlled by this phenomenon since the leakage flux induces a secondary voltage across in the winding which has opposite polarity to the primary voltage, thereby permitting the current to be controllably reduced/limited. For example, to encourage and control leakage flux the designer may vary the gap width; axial length; radial height; gap surface area; gap surface topography; and gap magnetic flux permeability.

The prior art teaches that flux leakage is inefficient, and to be avoided, reduced or compensated for wherever possible, to increase machine efficiencies and reduce unwanted magnetic interactions, etc. See, for example, U.S. Pat. No. 5,955,809 and U.S. published patent application US2003/0042814. The improved machine and method, therefore, depart significantly from the prior art by encouraging a leakage flux, and do so for the novel purpose of controlling a machine maximum current, for example in the event of an internal short circuit.

In one aspect, there is provided an electric machine operable as an alternator, the machine comprising: a rotating magnetic rotor assembly; and a stationary stator assembly mounted adjacent the rotor assembly such that an annular rotor air gap separates the rotor assembly from the stator assembly, the stator assembly including a plurality of lengthwise extending slots on a cylindrical surface of the stator assembly and opposed to the annular rotor air gap, the stator assembly further including at least one electrical winding disposed in at least one of the lengthwise extending slots defined in the stator assembly, the at least one electrical winding being electrically connected to a machine output adapted to deliver generated output electricity from the machine, the slots having slot gaps on the stator surface thus defining teeth members, the teeth members being disposed between the at least one winding and the rotor, the slot gaps having a circumferential width Gg, a radial height Hg and an axial length Lg, defining an area of the gap as a function of Hg and Lg, wherein, in use, movement of the rotor assembly induces a first alternating voltage and current in the at least one winding, characterized in that said slot gap is sized by selecting given values of circumferential width Gg or area of the gap so as to have an associated leakage self-inductance such that, in use, a leakage magnetic flux flows across said slot gaps and around the at least one winding in order to induce in said winding a counter-voltage of a given magnitude in response to said induced alternating current in said winding, thereby limiting a maximum output current in the at least one winding to a pre-selected value.

In another aspect, there is provided a method of making a stator assembly for an electrical machine, the method characterized in that it includes the steps of providing a stator having a first face and a second face, the first face adapted to be positioned adjacent a rotor assembly such that an annular rotor air gap separates the rotor assembly from the stator assembly, the second face having a first set of slots defined therein and adapted to receive electrical windings therein; inserting at least one electrical winding into the first set of slots; providing a back iron adapted to be mounted to the second face; mounting the back iron and stator to one another to provide a stator assembly; and then providing a second set of slots in the first face of the cylindrical stator, the second set of slots communicating with at least some of the first set of slots, the second set of slots having a circumferential width Gg, a radial height Hg and an axial length Lg, defining an area of the second slots as a function of Hg and Lg, said stator assembly allowing for a leakage magnetic flux to flow across said second slot and around the at least one winding when current flows in said winding, this leakage magnetic circuit having a given leakage inductance, said leakage magnetic flux inducing a counter-voltage in said winding of polarity in opposition to the main voltage that causes the primary current, further characterized in that the second slots are sized by selecting given values of circumferential width Gg or area of the slot so as to have an associated leakage inductance such that the flux across said slot and around the winding induces a counter-voltage of a given magnitude so as to limit a maximum output current in the at least one winding to a pre-selected value, the pre-selected value selected to be below a current at which the machine is thermally damaged by heat generated in the at least one winding.

Still other aspects will be apparent from the attached description and figures. The invention is applicable to at least an electric machine with an internal rotor and a surrounding external stator, where the stator slots extend axially on an internal surface of the stator; and an electric machine with an internal stator and a surrounding external rotor, where the stator slots extend axially on an external surface of the stator. Application to other machines is also taught.

DESCRIPTION OF THE DRAWINGS

In the figures:

FIG. 7 is an enlarged cross-section of an example of a rotor and stator according to a further alternate embodiment of the present invention.

DETAILED DESCRIPTION OF PREFERRED EMBODIMENTS

The improved apparatus and method are used for controlling and/or limiting a primary circuit current, including a short circuit current, through the windings of an electric machine such as a motor, generator or alternator, either permanent magnet or otherwise.

By using a physical behaviour of the electromagnetic circuit in a machine, known as the leakage flux, it is possible to limit maximum currents in the windings of the machine. Leakage flux is well-known and understood in transformer design, but heretofore the machine designer has typically only considered flux leakage in the pursuit of minimising such leakage to improve machine efficiency and prevent unwanted interactions (e.g. magnetic coupling) between permanent magnet rotors and other subsystems.

In the improved machine, however, leakage flux is encouraged as a means to limit current inside the machine—as a matter of design. By creating a leakage flux which counters the primary flux path, the maximum current in the machine may be limited. Leakage flux is encouraged through the choice and selection of certain parameters of the machine's configuration, as will be better described below.

In one embodiment, the given effect results through design control of the stator slots. While it is indeed well-known to provide winding slots in a stator, the configuration and design steps taken to provide such slots are both believed to be novel.

In a second aspect, the stator slots are filled with a slot cap material. These and other specific embodiments will now be discussed.

Figure 5:
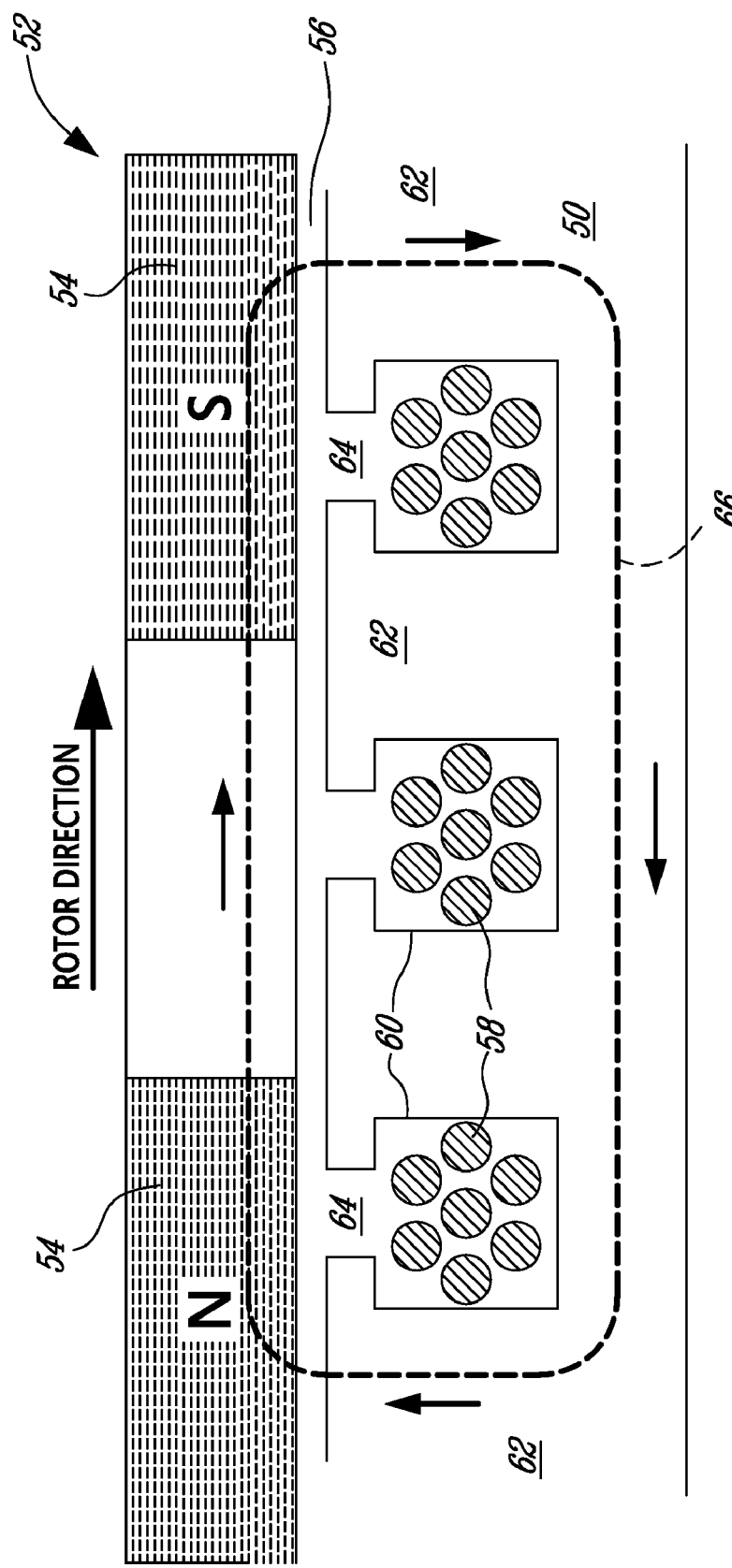
FIG. 5 is an enlarged cross-section of a rotor and stator according to the prior art.

Referring first to FIG. 5, a prior art stator 50 and permanent magnet rotor 52 are shown schematically and, for ease of depiction only, are both shown partially and as planar bodies. Rotor 52 has magnets 54 arranged in and alternating 'North' and 'South' pole arrangement, and is separated from stator 50 by a rotor air gap 56. Winding or windings 58 are provided in slots 60 between adjacent teeth 62 in stator 50. Each slot 60 has a winding gap 64 which permits windings 58 to be inserted into slot 60, typically by an automated winding machine, as is well known in the art. The winding gap 64 is typically at least several winding-widths (or diameters) wide, to permit the winding to be provided accurately and efficiently in each slot 60. In use, as rotor 52 passes over stator 50, a primary magnetic flux path 66 is set up, as magnetic flux travels from rotor 52, across rotor air gap 56, down a particular tooth 62, around slots 60 and along the core of stator 50 and then back up a further successive tooth 62 to rotor 52, across rotor air gap 56. As air has a magnetic permeability of almost zero, and because the winding gap 64 is quite large (relatively speaking), almost no magnetic flux passes along the stator face (i.e. adjacent rotor air gap 56), because such flux is impeded by the winding gap 64. Magnetic flux along such a "tooth-top" path is also intentionally impeded, by design, to ensure the primary flux path usefully passes around windings 58.

Referring now to FIGS. 1-4, FIG. 1 illustrates an example of an internal stator 1 for placement inside an external rotor 10. In the embodiment shown, the stator 1 has a plurality of stator slots 2 extending axially on an external cylindrical surface of the stator 1. Stator slots 2 have a slot gap 7 on a surface 8 to be disposed adjacent rotor 10. As will be described in greater detail below, however, unlike the prior art the slot gaps 7 are not provided for the purpose of inserting winding conductors 3 into stator and, in fact, slot gaps 7 are preferably as narrow, and more preferably narrower than, the width of an individual winding conductor 3. For example, a slot gap 7 accordingly to the present invention may be only 0.040" in width(depending on a machine's design), which will clearly be understood by the skilled reader to be too narrow to permit windings to be inserted therein by prior art winding methods. This embodiment is thus clearly distinguished from prior art winding gaps, as will be discussed in greater detail below. The invention is also applicable to an electric machine with an internal rotor and a surrounding external stator and, in such a case, the stator slots 2 would of course extend axially on an internal surface of the stator (ie. adjacent the rotor), as will be apparent from this description. The invention applies to a motor and a generator/alternator.

Figure 1:
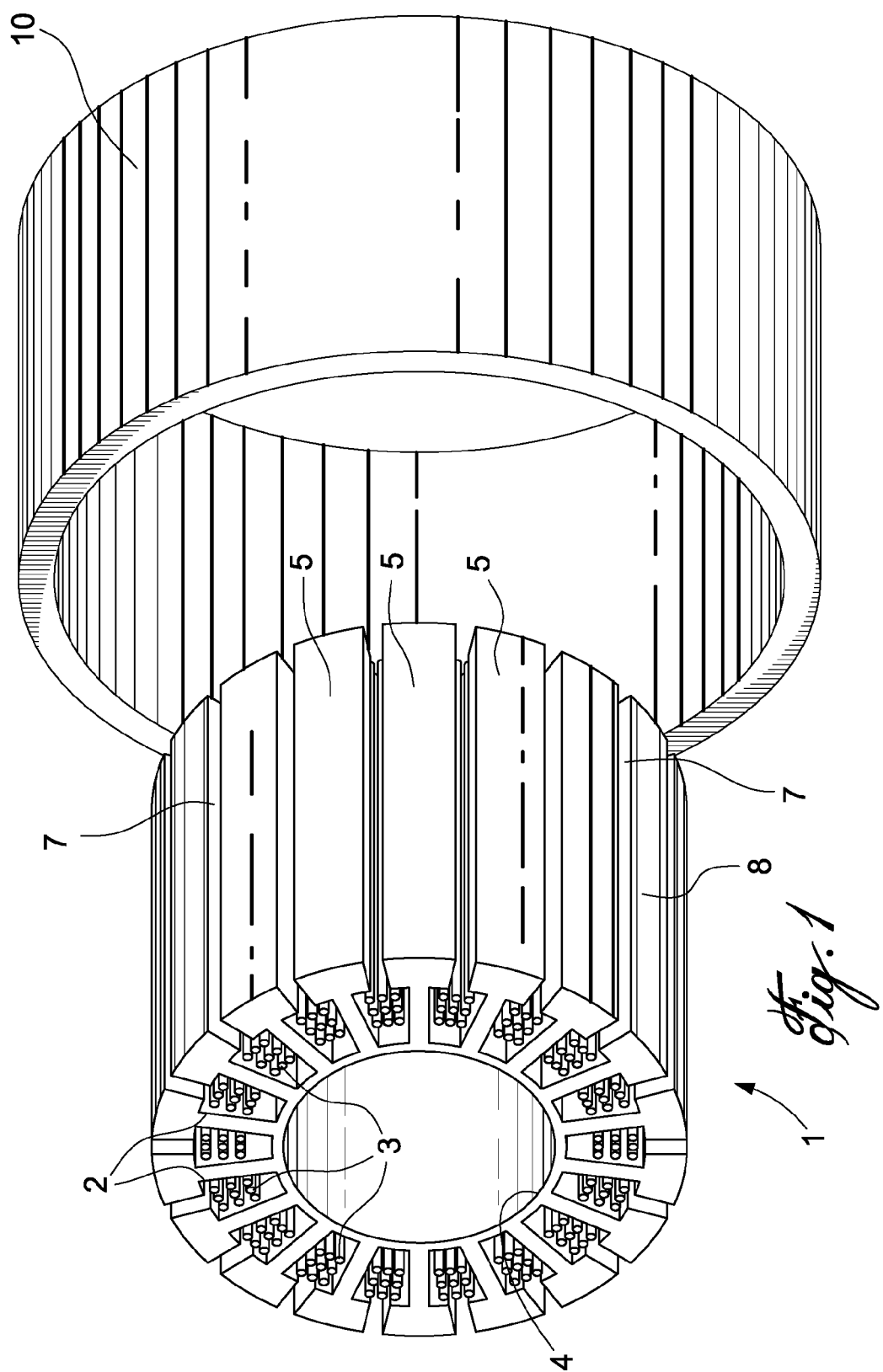
FIG. 1 is an example of an axial sectional perspective view of a stator and rotor, as improved, with axially extending slots housing conductor windings, and showing the axially extending slot gaps.
Figure 4:
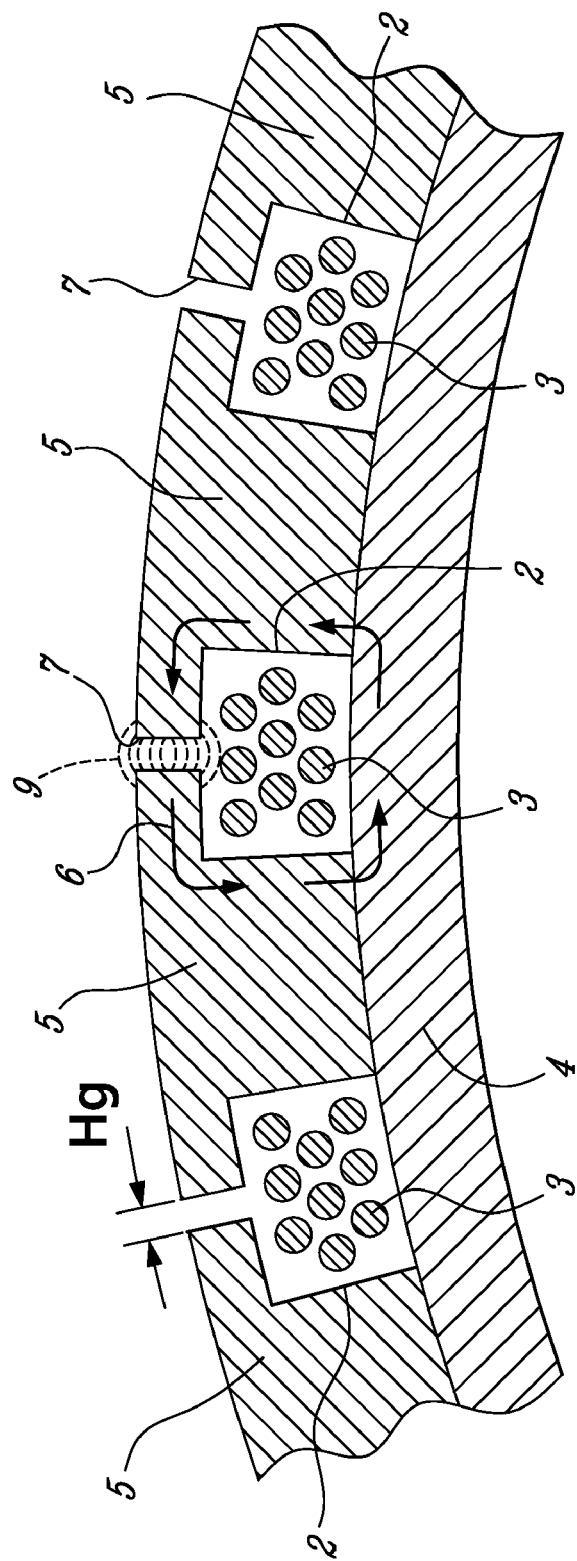
FIG. 4 is a partial axial sectional view showing an example of an alternative stator construction using a cylindrical internal back iron and T-shaped stator members to define stator slots and slot gaps independent of the width of conductors.

FIGS. 1 and 4 illustrate the general structure of an improved stator 1, having a cylindrical back iron 4 upon which are mounted axially extending T-shape teeth members 5 to define rectangular axially extending stator slots 2 to house a plurality winding conductors 3. Stator 1 is thus a composite stator composed in this case of back iron 4 and stator 5. The stator 1 has a plurality of stator slots 2 where each slot 2 houses conductor windings 3. Each slot 2 has a slot gap 7 adjacent to the rotor 10 and in communication with an annular rotor air gap 20 (see FIG. 6) separating the rotor from the stator 2.

Figure 6:
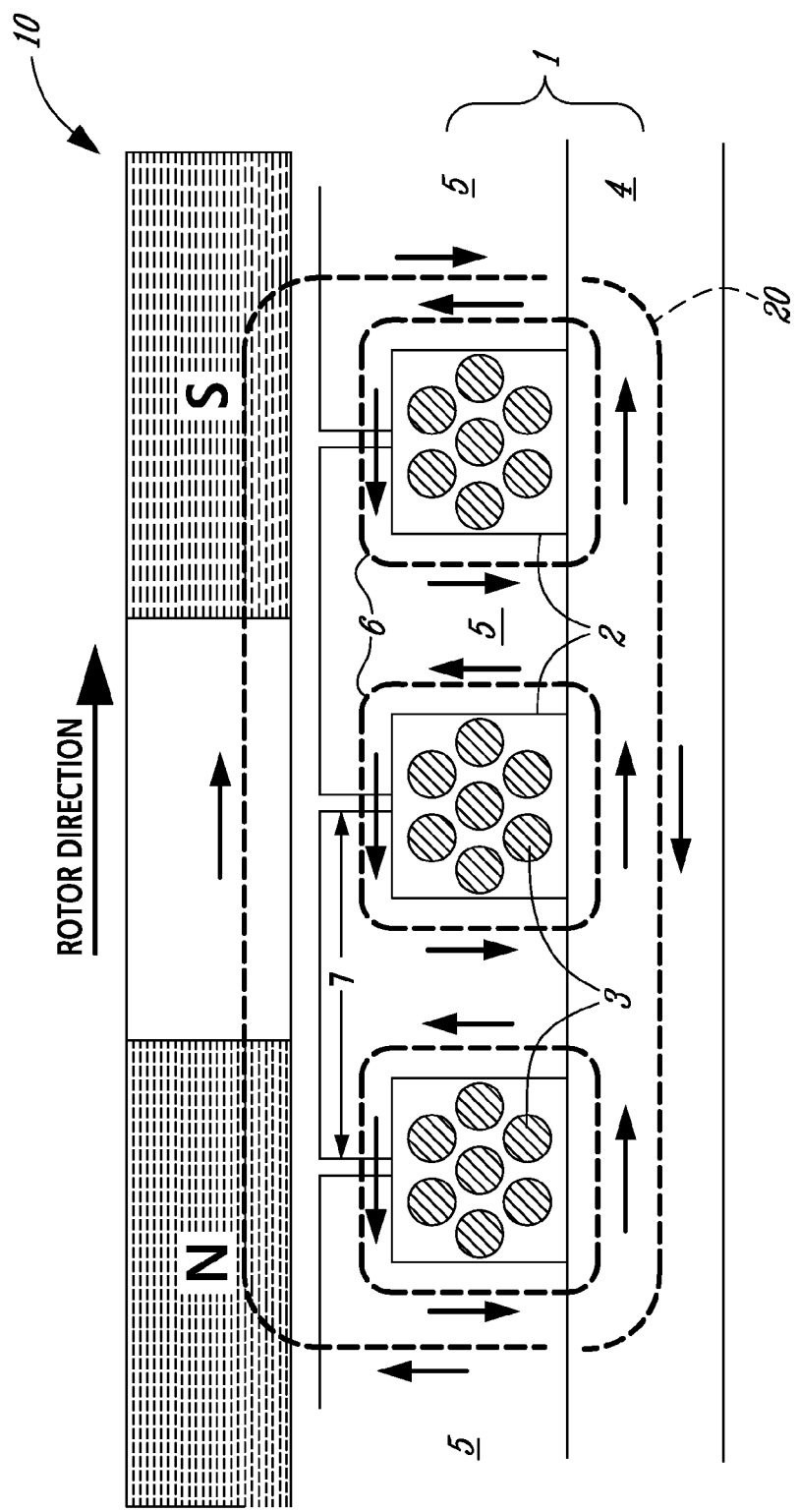
FIG. 6 is an enlarged cross-section similar to FIG. 5, however instead depicted is the improved device of FIG. 1.

Referring now to FIG. 6, in use, as rotor 10 passes over stator 1, a primary magnetic flux path 20 is set up, as magnetic flux travels from rotor 10, across rotor air gap 22, down a particular tooth 5, around slots 2 and along back iron 4, and then back up a further successive tooth 5 back to rotor 10, across rotor air gap 22. However, unlike the prior art, a secondary or leakage flux 6 flow is encouraged around each group of winding conductors 3 (in this embodiment), by reason of the increased leakage inductance caused by the width of the winding gap 7 in relation to the magnitude of the current passing through winding 3. The secondary or leakage flux 6 is proportional to the current flowing through winding 3 and in a direction opposite to the primary flux 20. This phenomenon, as it is presently understood, will now be described in greater detail.

Figure 2:
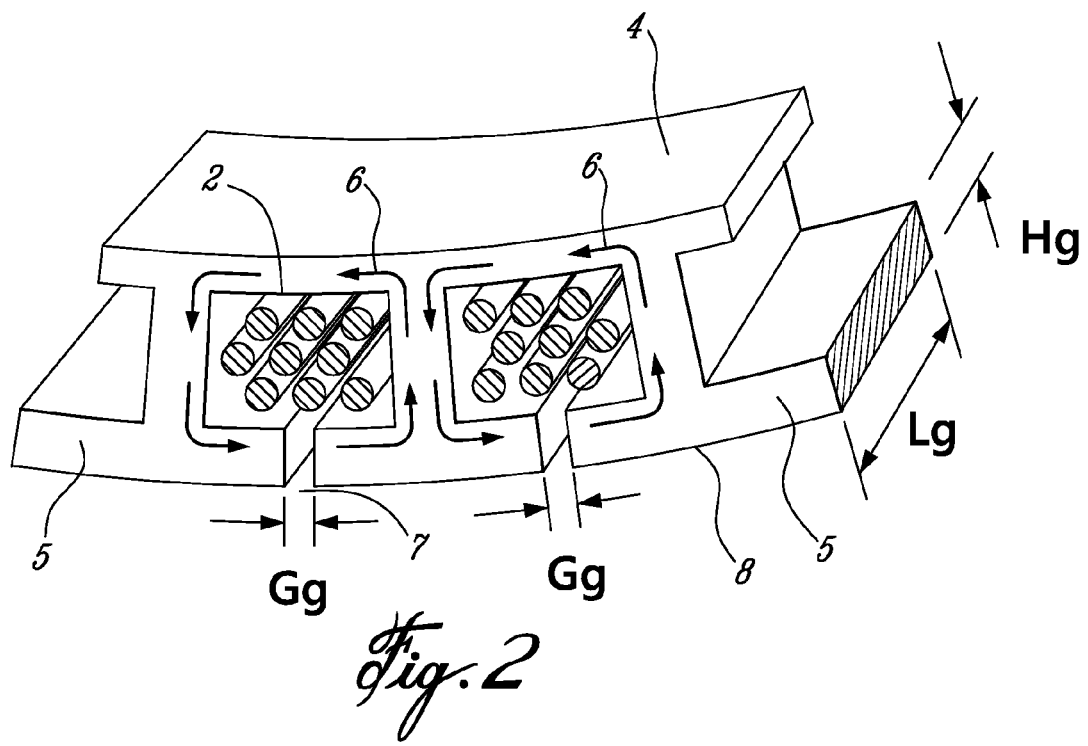
FIG. 2 is an example of a detailed axial sectional view showing two stator slots with conductor windings and slot gap width dimension ($G_g$), also showing the circulation of leakage flux with arrows.

As indicated in FIGS. 2 and 4, when the machine is operated, the primary current conducted through the windings 3 generates a magnetic leakage flux circuit 6 about the periphery of the stator slot 2 and passing across the slot gap 7 as best shown in FIG. 4. It will be understood by those skilled in the art that the high permeability of the materials used to construct the back iron 4 and the T-shaped member 5 such as silicon iron, have a tendency to confine the magnetic circuit, (although as indicated in FIG. 4, a certain amount of magnetic flux fringing 9 will occur in the peripheral edges of the slot gap 7). Materials preferred by the inventor for construction are: samarium cobalt permanent magnets, maraging steel (preferably 250 or 300) retention sleeve, aluminum yoke, copper primary and secondary windings, silicon iron, SM2 or other soft magnetic material for the stator teeth and laminated silicon steel for the back iron. The stator material is rigid. Slot 2 is sized sufficiently to house conductors 3. Preferably, slot gap 7 is sized to provide a suitable leakage flux 6, as will now be described.

Figure 3:
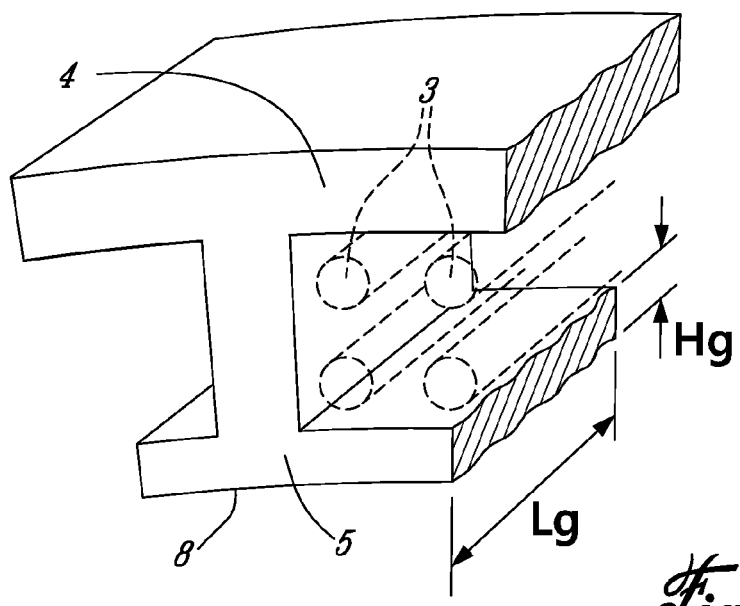
FIG. 3 is a detail perspective view of a flux conducting surface of a slot gap of FIG. 2 indicating the axial length dimension ($L_g$) and the radial height dimension ($H_g$) of the slot gap.
Figure 8:
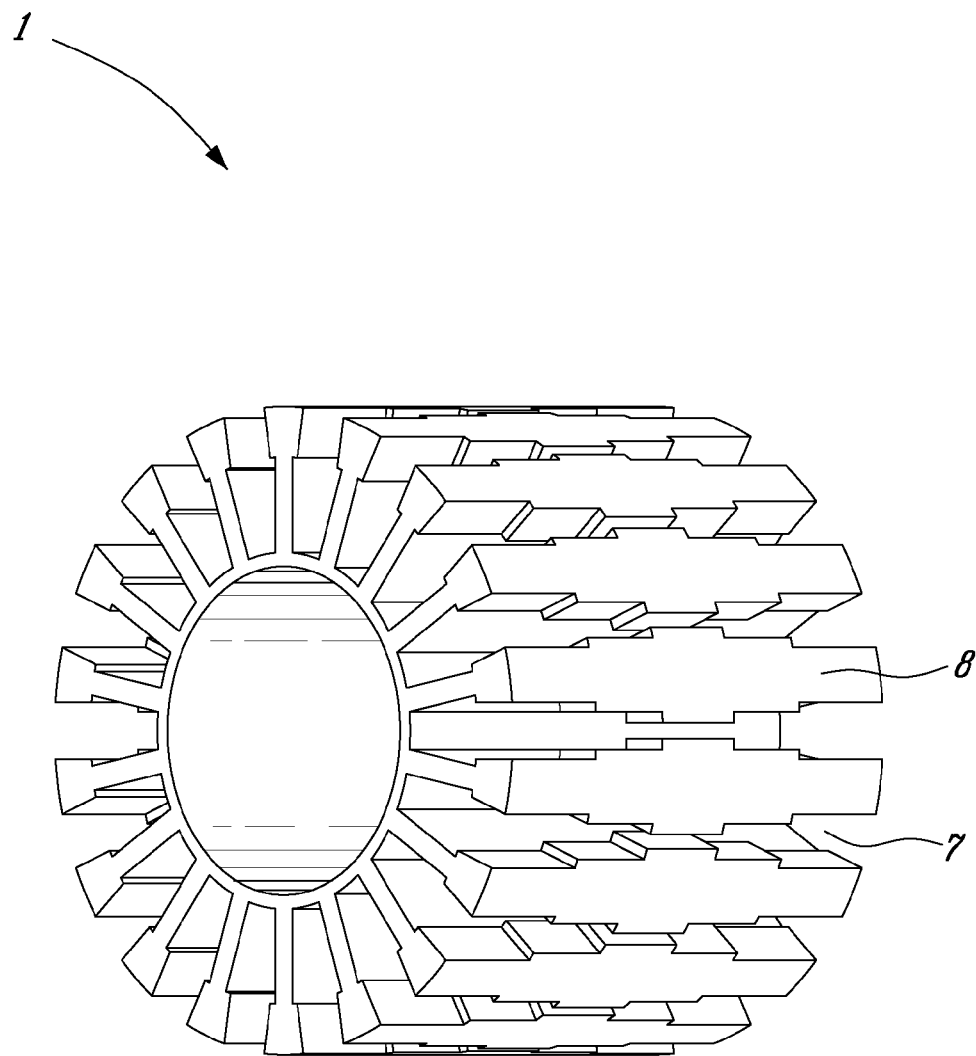
FIG. 8 is an enlarged isometric view of an example of a stator according to yet further alternate embodiment of the present invention.

Referring again to FIGS. 2 and 4, the leakage flux 6 circulation is indicated with arrows. FIGS. 2 and 3 show details of the slot gap 7 parameters in a simple embodiment having an axially extending slot gap 7 of width dimension $G_g$ having an axial length dimension of $L_g$ and a radial height dimension of $H_g$. The gap surface area may be derived by multiplying $L_g \times H_g$. However, it will be understood in light of this disclosure, that the gap geometry and surface topography may be varied considerably, for example as shown in FIG. 8, to include ridges, or other surface features to improve or otherwise affect the transmission of magnetic flux or vary the distribution of magnetic flux extending across the slot gap 7. Further, the magnetic permeability and therefore the gap flux density can be adjusted by the selection of materials and dimensions for the back iron 4 and T-shaped members 5. Alternately, a slot gap cap may be provided to cap slot gap 7 partially or entirely, as described further below.

Optionally, the stator material including the back iron 4 and or T-shaped member 5 can be selected such that at least a portion of the stator has a Curie temperature which is below maximum design operating below a temperature for the machine, such that (according to the teachings of the inventor's U.S. Pat. No. 6,313,560, the teachings of which are fully incorporated into this disclosure by reference) the magnetic flux circulation through the stator material will be impeded when the stator material acquires a temperature above the Curie temperature. Such design is preferably configured such that the secondary or leakage flux 6 is less affected by the Curie-point 'effect' than the primary flux path. It is preferably that the inventor's Curie-point effect be maximized for primary flux flow and minimized for secondary or leakage flux flow to gain the most satisfactory benefit from the use of such feature with the present invention. In any event, the improved machine may be used in conjunction with one or more means to thereby assist in providing maximum current protection to an electric machine.

The multi-piece stator of FIGS. 1-4 and 6 may be provided in the following steps: providing by any suitable means, a stator ring 5 having slots 2, wherein slots 2 are on the side opposite rotor face 8; providing windings 3 into slots 2; mounting back iron 4 to the tooth-ring by any suitable method (e.g. by bonding); and then providing slot gaps 7 by any suitable method (e.g. cutting).

Figure 6A:
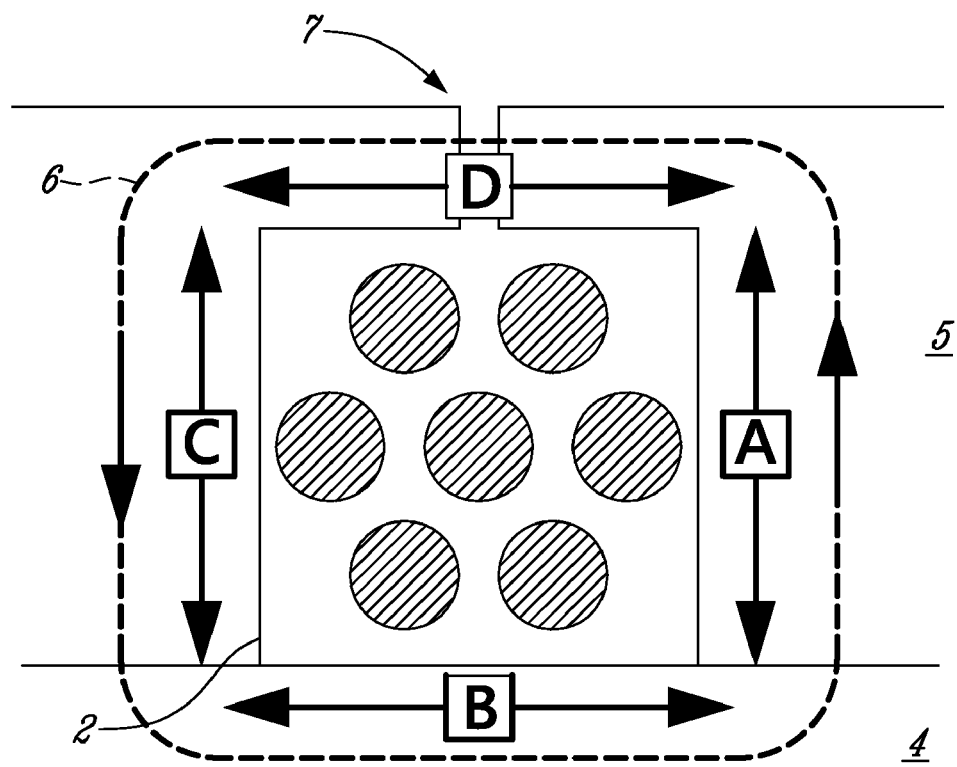
FIG. 6a is an enlarged portion of FIG. 6.

Referring to FIG. 6a, the path 6 that the leakage flux travels around winding 3 may be thought of as comprising several path components—in this case components A-D. In the discussion above and below, the skilled reader will understand in light of this disclosure that, although the inventor prefers to focus design attention in applying the present invention to the portion of the stator denoted as path D in FIG. 6a, one or more path components may be designed appropriately implement the present invention.

Referring to FIG. 7, an example of a second embodiment is shown. The reference numerals defined above will also be used to denote the analogous features in this embodiment. In FIG. 7, stator 1 is composed of a single piece (i.e. back iron 4 and teeth 5 are integral with one another) and winding 3 comprises a single conductor. Also in this embodiment, a winding gap 30 may be partially or completely capped or filled by one or more filler or slot cap members 32, optionally composed of a material having higher magnetic permeability than air, but less permeability than the stator material, and thus permitting a sufficient leakage flux 6 to be induced, in use to permit the current in windings 3 to be limited to a desired level, as was described with respect to the previous embodiment. It will be understood, however, that in this embodiment slot cap members 32 replace (preferably completely) winding gaps 7, in both space and function. The designer may select the slot cap and stator materials and dimensions according to the teachings of this disclosure to manage the leakage inductance, and thus limit the maximum current of the machine, in a manner as will now be described in more detail.

Referring now to FIGS. 1-4, the means by which the invention limits the primary current conducted through the windings 3 of the stator 2 will be described below.

The present method involves controlling the slot gap parameters to provide a desired a leakage flux inductance and thus, leakage impedance. The leakage flux induces a secondary voltage in the windings 3 of polarity in opposition to the primary current, in accordance with "Lenz's law", which dictates that an electric current induced by a changing magnetic field will flow such that it will create its own magnetic field that opposes the magnetic field that created it. In the prior art, however, the winding's "own magnetic field" was not permitted to flow in any appreciable way by reason of stator geometry (i.e. the air gap was too wide). The inventor has recognized, however, that if an induced leakage flux is encouraged to encircle a winding, the effect of the opposing of magnetic fields on winding voltage can be used advantageously to limit the maximum possible current flowing through the winding, thus providing the machine designer with a tool to providing intrinsic short circuit protection.

In the prior art, the winding gap (with air therein between) was so large that very high magnetizing forces (B) would be required to force a magnetic flux to cross the gap. The magnetic permeability of air is, of course, very low, being essentially that of free space ($\mu_o$). At prior art winding gap distances, insufficient magnetomotive forces (mmf) was provided by the magnetic circuit to force a magnetic flux to cross the winding gap. It is of course understood that, in prior art designs, as the machine size grows, so too can the associated magnetizing forces, however winding size also increases to handle the increased current load, and therefore so too does winding gap size. Thus, regardless of machine size, the magnetic permeability of the winding air gap remains a barrier to a magnetic flux path in the portion of stator (including the air gap) between the windings and the rotor.

It is generally known that the internal impedance of an electric generator/alternator governs the short circuit current of the machine. As is well understood, the internal impedance is related to the number of winding turns, magnetic flux parameters, among other things, and is commonly referred to as the "commutating inductance" or "commutating impedance" of the electric machine. Although a machine's commutating inductance typically determines the machine's short circuit current, it is well-understood that this property cannot be effectively used by the designer to control the maximum current inside the electrical generator/alternator, since increasing the commutating inductance also increases the voltage generated at a given speed. The short circuit current is calculated by voltage÷commutating impedance, which both increase in proportion to speed (i.e. frequency). Therefore, increasing the commutating inductance also increases the voltage generated at a given speed and as such will not limit the short circuit current.

However, as improved, the total impedance of the electric machine can also be increased (to thereby limit maximum current) by an additional phenomenon, namely the "leakage inductance" of the machine. The leakage inductance has an associated leakage impedance which is independent of the machine's commutating inductance impedance. Therefore, leakage inductance can be used to adjust the maximum current with little effect on the unloaded output voltage of the machine. The leakage flux is a direct result of the current passing through the windings 3 and, according to Lenz's law, is opposite in polarity. Thus, leakage flux can be used to control the short circuit current through the windings 3. The leakage inductance is proportionally to leakage flux and thus varying the inductance permits the designer to achieve a flux sufficient to attain the necessary voltage to limit the current appropriately in the machine. The leakage inductance of a permanent magnet alternator (or any machine) can be accurately defined and controlled by defining an appropriate shape or configuration for the stator, and by selecting appropriate materials for construction of the stator. For example, the designer may ensure the secondary magnetic path has sufficient inductance by varying the gap 7 parameters between the winding slots 2. The leakage inductance (and hence the leakage impedance) can also be adjusted in design, according to the designer's wishes by, for example, varying the width $G_g$ of the slot gap 7 or area of the gap 7 (i.e.: $H_g \times L_g$) (in the case of FIGS. 1-4), or by varying the permeability of the slot gap 7, i.e. by selecting a slot cap material and dimensions (in the case of FIG. 7). This, the inductance of the secondary magnetic circuit (i.e. the leakage path) can be selected in view of the expected current in the winding, in use, to encourage a sufficient leakage flux around the winding to induce the necessary counter-voltage to limit the maximum current in the winding to a value acceptable to the designer. Some iteration may be required in design.

It will be understood that complete elimination of the slot gap 7 is not preferred unless a slot cap material has a lower magnetic permeability and/or impedance than the stator teeth-back iron, so as not to detrimentally affect the primary magnetic circuit. It will also be understood that in this specification, including the claims, the terms "shape", "configuration" and "construction" are used to refer to stator design parameters such as dimensions, relative proportions, material selection (which may include the selection of "air" as a "material" in the case of the selection of an air gap), magnetic permeability, and so on, which affect the amount of magnetic flux which travels around the windings through the stator as the result of a current flow in conductor 3.

As improved, the induced leakage flux which and is generated by the current flow in the windings and is encouraged (by reason of the stator geometry and material provided) to circulate around the wire bundle of the windings 3. Therefore, altering the stator configuration to narrow (or close altogether) the gap between adjacent teeth tends to close the magnetic circuit around windings 3, thus causing an increase in slot winding inductance without increasing the commutating inductance of the machine. The total machine inductance is thus increased. The magnitude of the leakage flux 6 may be adjusted in design, for example, by selecting gap dimensions (for example width $G_g$, and gap area $A_g$, or height $H_g$ length $L_g$)(in the case of FIG. 1), or by selecting and sizing an appropriate slot cap material (as in the case of FIG. 7), as described above. The leakage flux 6, which is generated as a function of the current flowing in the windings 3 (i.e., not as a function of the magnets on the rotor), results in a voltage being induced in the windings 3 which opposes the flow of current (inductive reactance) which induces the leakage flux 6.

The present invention teaches determining and selecting a magnetic inductance of the portion of the stator immediately surrounding the windings, including the air gap, if any, to thereby encourage a sufficient magnetic flux to flow around the windings, to permit the designer to limit the winding maximum current by design. As winding current increases, so too does the leakage flux and induced 'counter-voltage' (which is subtractive relative to the primary current in the winding), and therefore encouraging leakage flux has a limiting effect on the output current in the winding. Increasing the overall leakage inductance (relative to the nominal maximum current in the winding) of the secondary magnetic path encircling the winding thereby permits a sufficient leakage flux to be induced, which in turn induces an opposite polarity voltage (according to Lenz's law) across the windings of sufficient size to permit a desired maximum current limit to be achieved. As mentioned, the inductive reactance voltage is proportional to the primary current flow through the windings. Therefore, as the primary induced current level tends to increase, so too does the counter balancing leakage-induced counter-voltage. Intrinsic means to limit the current passing through the windings is thereby provided by the invention. In effect, the invention involves providing a torriodal magnetic flux conductor of sorts around the machine windings. Preferably, a leakage inductance is selected in design such that the maximum winding current is low enough to negate the possibility of thermal damage to the machine in the event of a short circuit, or other fault otherwise tending to increase the current in the windings. In any event, the net result of the present invention is to limit the current in the windings no matter what is causing the current flow, be it an externally applied AC voltage or voltage induced by the rotating magnetic field. Inductive reactance is directly proportional to a rate of change (or frequency) of the current. The counter-voltage induced in by a permanent magnet (PM) machine winding 3 is directly proportional to the frequency of rotation and, as such, this invention advantageously results in a constant short circuit limit value regardless of the PM machine speed or unloaded output voltage value.

Figure 9:
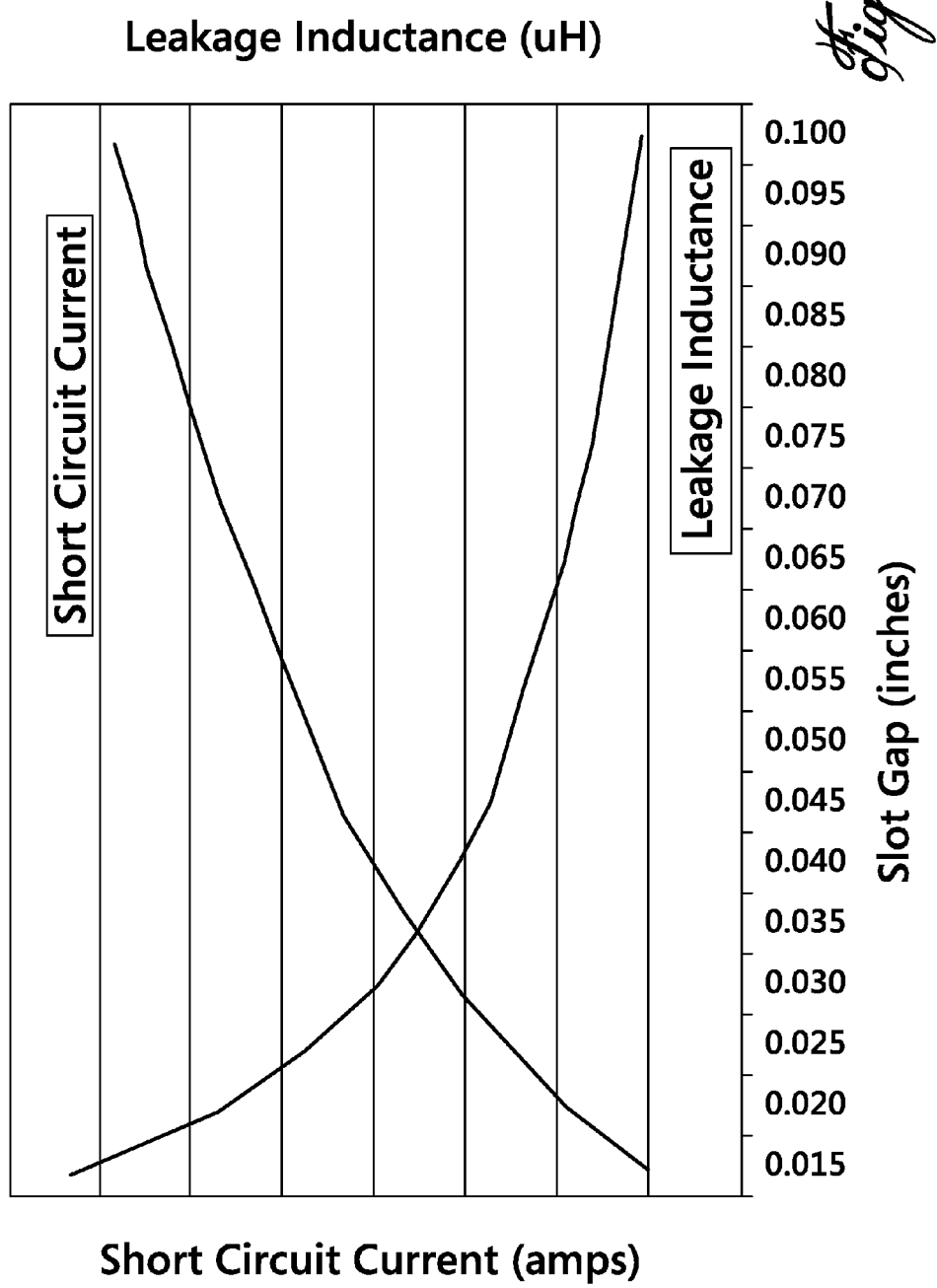
FIG. 9 is a graph representing an example of the relationship between maximum current, leakage inductance and slot gap width, as improved.

Leakage inductance is a function of the total flux around windings 3. Total leakage flux is a function of total flux density×area (i.e. $\Phi=B \times A$), and is thus affected by the width of the air gap (or slot cap width, as the case may be) and magnetic permeability of the gap (i.e. air or other material). Thus, in order to achieve a desired inductance, the designer may adjust, for example, the gap face area (i.e. $L_g$ and/or $H_g$), the gap width (i.e. $G_g$) and/or the magnetic permeability of the gap (e.g. air, or by selected slot cap material) to achieve a desired leakage inductance. The designer may thus adjust the shape, configuration and construction of the stator assembly to achieve the disclosed current-limiting means. In general, however, other design consideration may also affect the designer's choice of parameters. For example, to lessen the effects of ripple torque in the device, one may tend to choose a small gap width (i.e. $G_g$), and then size the other parameters appropriately to achieve the intended design result limiting a maximum current in the manner intended. FIG. 9 plots the relative relationship between slot gap width, leakage inductance and short circuit current for a given slot face area ($L_g \times H_g$) and machine configuration. Demonstrated is the inverse relationship between leakage flux and short circuit (or maximum) current in the machine. Machine geometry, etc. will of course affect the exact nature of the plotted relationship.

In the prior art, the designer focused on manufacturing considerations in selecting an electric machine's winding gap sizes, in an effort to ensure that the selecting conductor sizes permitted the desired number of turns to be efficiently provided in the stator slots using automatic winding machines. Other manufacturing considerations also preoccupied the designer in selecting the winding gap size. In contrast, the first embodiment of the present invention frees the designer from such considerations by providing alternate means to provide the winding in the slot, and therefore, the slot gap 7 on face 8 adjacent the rotor is available for application of the short circuit limiting concept of the present invention.

As discussed briefly above, in prior art electric machines (see FIG. 5), the size of the conductor windings 3 and other assembly parameters typically define the width $G_g$ of the gap 7. However, by the provision of a multi-piece stator 1, thereby eliminating the need to insert the windings 3 in the slot 7 (utilizing a back iron 4 which is assembled after insertion of the windings 3), it is possible to set the slot gap 7 parameters to any value desired to attain the appropriate leakage inductance, as described above. This may of course include selecting a width $G_g$ which is too narrow to permit the passage of the windings 3 through it. As mentioned above, narrowing the gap width $G_g$ closes the magnetic circuit around the individual slot windings 3.

Therefore, the necessary leakage flux impedance is determined and provided during the design stage such that the short circuit current may be limited by the designer using the present invention to achieve an acceptable maximum value, based on the thermal characteristics of the machine, and cooling scheme. Thus, the machine design itself may prevent a temperature rise in a short circuit condition to a level that would cause thermal damage the insulation in the winding 3 and/or structure of the stator 1.

The improved method permits the designer to ensure that the maximum limited current in the winding 3 does not cause current high enough to melt down the windings or cause other critical damage. The invention may be used independently to limit the maximum available current and power deliverable by an alternator or generator design, or may be used in conjunction with the inventor's Curie point protection scheme, as described above. It is considered that an internal stator 1 as illustrated in FIG. 1 is likely to be more easily fabricated by forming the slot gaps 7 on the external surface of the cylindrical member. However, the invention will be understood as not being limited to this type of stator 1 configuration. A two-piece stator is not necessary to achieve the present invention in the first embodiment. Alternately, the windings may be directly inserted into stator through the ends of the slots (e.g. perhaps by threading or the use of a multiple-piece winding which is assemble on the stator).

It will be understood that in this description, and in the attached claims, the term "slot" is used to describe the portion of the stator receiving the winding(s). A "slot", therefore, may be a typical slot per se (i.e. having one open side along its length), or may be some other recess within the stator capable of receiving a winding(s) (e.g. see FIG. 7, wherein the "slot" has no open sides along its length). The term slot is used, therefore, for convenience only, and it not intended to limit the scope of the invention as described, or claimed.

Although the above description relates to a specific preferred embodiment as presently contemplated by the inventor, it will be understood that the invention in its broad aspect includes mechanical and functional equivalents of the elements described herein. For example, any number of windings and any winding configuration may be provided. The stator may be a single (integral) piece, or may be multi-piece. The machine need not be a permanent magnet machine, and other types of machines may be adapted to incorporate the improvements according to the teachings of this disclosure. The slot and tooth configuration may be varied to suit the machine's design. Skilled readers will recognize that still other modifications are possible without departing from the scope of the inventions disclosed and claimed herein.

What is claimed is:

1. An electric machine operable as an alternator, the machine comprising:
    a rotating magnetic rotor assembly; and
    a stationary stator assembly mounted adjacent the rotor assembly such that an annular rotor air gap separates the rotor assembly from the stator assembly, the stator assembly including a plurality of lengthwise extending slots on a cylindrical surface of the stator assembly and opposed to the annular rotor air gap, the stator assembly further including at least one electrical winding disposed in at least one of the lengthwise extending slots defined in the stator assembly, the at least one electrical winding being electrically connected to a machine output adapted to deliver generated output electricity from the machine, the slots having slot gaps on the stator surface thus defining teeth members, the teeth members being disposed between the at least one winding and the rotor, the slot gaps having a circumferential width Gg, a radial height Hg and an axial length Lg, defining an area of the gap as a function of Hg and Lg,
    wherein, in use, movement of the rotor assembly induces a first alternating voltage and current in the at least one winding,
    characterized in that said slot gap is sized by selecting given values of circumferential width Gg or area of the gap so as to have an associated leakage self-inductance such that, in use, a leakage magnetic flux flows across said slot gaps and around the at least one winding in order to induce in said winding a counter-voltage of a given magnitude in response to said induced alternating current in said winding, thereby limiting a maximum output current in the at least one winding to a pre-selected value.

2. The electric machine of claim 1 wherein the pre-selected value is below a current magnitude at which the machine will be thermally damaged by reason of such current magnitude passing through the winding.

3. The electric machine of claim 1 wherein the slot gaps are narrower than the at least one electrical winding.

4. The electric machine of claim 1 wherein the rotor includes a plurality of permanent magnets.

5. The electric machine of claim 1 wherein a portion of the stator assembly is comprised of a material having a Curie point below a threshold temperature, the threshold temperature being a maximum temperature sustainable internally in the machine without the machine suffering critical thermal damage.

6. The electric machine of claim 1 wherein the at least one slot comprises a plurality of slots defined at least in part by a stator core portion and pairs of adjacent teeth members extending from the core portion, the core portion providing a bottom for said slots, the plurality of spaced-apart teeth members and core portions being separate pieces of the stator assembly.

7. The electric machine of claim 6 wherein the plurality of spaced-apart teeth members and the slot top portion are integral with one another.

8. The electric machine of claim 1 wherein the slot gap size is unsuitable to permit the winding to be inserted therethrough into the stator assembly.

9. The electric machine of claim 8 wherein the winding is inserted into the slot via a slot end opposite the slot gap.

10. The electric machine of claim 6 wherein the winding is inserted into the slot prior to assembly of the core and teeth member portions.

* * * * *